(12) United States Patent
Matsumoto (10) Patent No.: US 12,296,511 B2
(45) Date of Patent: May 13, 2025

(54) METHOD FOR PRODUCING MOLDED ARTICLE

(71) Applicant: Mitsubishi Gas Chemical Company, Inc., Tokyo (JP)

(72) Inventor: Nobuhiko Matsumoto, Hiratsuka (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 558 days.

(21) Appl. No.: 17/618,336

(22) PCT Filed: Mar. 4, 2020

(86) PCT No.: PCT/JP2020/009219
§ 371 (c)(1),
(2) Date: Dec. 10, 2021

(87) PCT Pub. No.: WO2020/250509
PCT Pub. Date: Dec. 17, 2020

(65) Prior Publication Data
US 2022/0227072 A1    Jul. 21, 2022

(30) Foreign Application Priority Data
Jun. 12, 2019  (JP) .................................. 2019-109805

(51) Int. Cl.
*B29C 43/14*       (2006.01)
*B29C 43/04*       (2006.01)
(Continued)

(52) U.S. Cl.
CPC .............. *B29C 43/14* (2013.01); *B29C 43/04* (2013.01); *B29C 45/0001* (2013.01);
(Continued)

(58) Field of Classification Search
None
See application file for complete search history.

(56) References Cited

U.S. PATENT DOCUMENTS 6,368,701 B1* 4/2002 Nomura .................. B29C 45/56
                                                     428/218
6,869,558 B2* 3/2005 Polk, Jr. .................. B29C 43/04
                                                    264/297.6
(Continued)

FOREIGN PATENT DOCUMENTS

CN         1816443 A      8/2006
CN       103347933 A     10/2013
(Continued)

OTHER PUBLICATIONS

CNIPA; Application No. 202080042251.X; Office Action dated Feb. 15, 2023, 7 pages.
(Continued)

*Primary Examiner* — Benjamin A Schiffman
(74) *Attorney, Agent, or Firm* — Fitch, Even, Tabin & Flannery LLP (57) ABSTRACT

To provide a production method with which a molded article excelling in surface appearance can be produced. The method for producing a molded article containing a thermoplastic resin and reinforcing fibers having a number-average fiber length of 1 mm or longer, wherein the method includes molding a material containing a thermoplastic resin and reinforcing fibers having a number-average fiber length of less than 30 mm using a first closed mold, and then molding only the molded material once again using a second closed mold.

19 Claims, 2 Drawing Sheets

(51) Int. Cl.
*B29C 45/00* (2006.01)
*B29C 45/04* (2006.01)
*B29C 69/02* (2006.01)
*B29C 70/12* (2006.01)
*B29C 70/46* (2006.01)
B29K 23/00 (2006.01)
B29K 77/00 (2006.01)
B29K 101/12 (2006.01)
B29K 105/08 (2006.01)
B29K 105/12 (2006.01)
B29K 307/04 (2006.01)
B29K 309/08 (2006.01)

(52) U.S. Cl.
CPC ...... *B29C 45/0005* (2013.01); *B29C 45/0055* (2013.01); *B29C 45/04* (2013.01); *B29C 69/02* (2013.01); *B29C 70/12* (2013.01); *B29C 70/46* (2013.01); *B29K 2023/00* (2013.01); *B29K 2077/00* (2013.01); *B29K 2101/12* (2013.01); *B29K 2105/0881* (2013.01); *B29K 2105/12* (2013.01); *B29K 2307/04* (2013.01); *B29K 2309/08* (2013.01)

(56) References Cited

U.S. PATENT DOCUMENTS

| | | | | |
|---|---|---|---|---|
| 7,858,172 | B2* | 12/2010 | Imaizumi | B29B 7/82 |
| | | | | 428/297.4 |
| 9,011,747 | B2* | 4/2015 | Tateyama | B29C 43/34 |
| | | | | 264/257 |
| 9,481,117 | B2* | 11/2016 | Sano | B32B 3/30 |
| 9,909,647 | B2* | 3/2018 | Nonaka | C08J 3/203 |
| 10,160,166 | B2* | 12/2018 | Ono | B29C 70/302 |
| 10,960,612 | B2* | 3/2021 | Ikeda | B29C 70/086 |
| 2010/0009158 | A1 | 1/2010 | Imaizumi et al. | |
| 2014/0004308 | A1 | 1/2014 | Taniguchi et al. | |
| 2015/0202807 | A1 | 7/2015 | Sano et al. | |
| 2016/0002832 | A1* | 1/2016 | Matsumoto | C08G 69/265 |
| | | | | 442/181 |
| 2016/0010246 | A1* | 1/2016 | Nakai | D02G 3/402 |
| | | | | 28/165 |
| 2016/0052234 | A1* | 2/2016 | Watanabe | C08J 5/18 |
| | | | | 442/268 |
| 2016/0208890 | A1 | 7/2016 | Nonaka et al. | |
| 2016/0221274 | A1 | 8/2016 | Ono et al. | |
| 2018/0186101 | A1 | 7/2018 | Ikeda et al. | |
| 2021/0331429 | A1 | 10/2021 | Ikeda et al. | |

FOREIGN PATENT DOCUMENTS

| | | |
|---|---|---|
| CN | 203957200 U | 11/2014 |
| CN | 105531101 A | 4/2016 |
| CN | 105579741 A | 5/2016 |
| CN | 106142595 A | 11/2016 |
| CN | 107848163 A | 3/2018 |
| EP | 3042753 A1 | 7/2016 |
| EP | 3233444 A1 | 10/2017 |
| JP | H04-82717 A | 3/1992 |
| JP | H05317411 A | 12/1993 |
| JP | 2011-132550 A | 7/2011 |
| JP | 4894982 B1 | 3/2012 |
| JP | 2013-199121 A | 10/2013 |
| JP | 2014 068767 A | 4/2014 |
| JP | 2014-104624 A | 6/2014 |
| WO | 2004/043686 A1 | 5/2004 |

OTHER PUBLICATIONS

Extended European Search Report issued in corresponding European Application No. 20822726.4 on Jun. 27, 2022 (8 pages).
International Preliminary Report on Patentability and Written Opinion for PCT/JP2020/009219, mailed Jun. 2, 2020, and English Translation submitted herewith (10 pages).
International Search Report for PCT/JP2020/009219, mailed Jun. 2, 2020, and English Translation submitted herewith (5 pages).

* cited by examiner

METHOD FOR PRODUCING MOLDED ARTICLE

CROSS-REFERENCE TO RELATED APPLICATIONS

This application is a U.S. national phase application filed under 35 U.S.C. § 371 of International Application Number PCT/JP2020/009219, filed Mar. 4, 2020, designating the United States, which claims priority from Japanese Application Number 2019-109805, filed Jun. 12, 2019.

FIELD

The present invention relates to a method for producing a molded article. Specifically, the present invention relates to a molded article containing a thermoplastic resin and reinforcing fibers having a number-average fiber length of 1 mm or longer.

BACKGROUND

In recent years, various types of fiber-reinforced resin materials in which a resin is reinforced with reinforcing fibers such as carbon fibers and glass fibers have attracted attention.

For example, Patent Document 1 discloses a method for producing a fiber-reinforced thermoplastic resin molded article made from a thermoplastic resin composition containing from 70 to 35 mass % of (A) an amorphous thermoplastic resin and from 30 to 65 mass % of (B) reinforcing fibers having a cross section that is a flat shape with a flatness of 2.3 or more, a mass-average fiber length of the reinforcing fibers in the molded article being 1 mm or longer, and the method including performing injection-molding of pellets prepared by coating the roving-type reinforcing fiber with the thermoplastic resin followed by cutting into pellets having a length of 3 mm or longer, using a slow compression type screw.

PATENT DOCUMENTS

Patent Document 1: JP 2013-199121 A

SUMMARY OF INVENTION

However, the present inventors conducted research, and discovered that when a material containing a thermoplastic resin and reinforcing fibers with a length of less than 30 mm is molded, even when molded with a closed mold, bending of the reinforcing fibers occurs and the surface appearance is degraded.

Therefore, an object of the present invention is to solve such problems and provide a production method, with which a molded article excelling in surface appearance can be provided.

The present inventors conducted diligent research to address the problems above, and as a result, discovered that the problems can be resolved by molding with a closed mold, and then once again molding with a closed mold. Specifically, the above problems can be solved by the following means.

<1> A method for producing a molded article, the molded article containing a thermoplastic resin and reinforcing fibers having a number-average fiber length of 1 mm or longer, the method including molding a material containing the thermoplastic resin and reinforcing fibers having a number-average fiber length of less than 30 mm using a first closed mold, and then molding only the molded material once again using a second closed mold.

<2> The method for producing a molded article according to <1>, wherein a shape of the second closed mold differs from a shape of the first closed mold.

<3> The method for producing a molded article according to <2>, wherein a material temperature when the material is applied to the second closed mold is from 0.1 to 7° C. lower than a material temperature when the material is applied to the first closed mold.

<4> The method for producing a molded article according to <2> or <3>, wherein a difference between a mold temperature when molding is performed using the first closed mold and a material temperature when the material is applied to the second closed mold is from 20 to 320° C.

<5> The method for producing a molded article according to <1>, wherein a shape of the second closed mold is identical to a shape of the first closed mold.

<6> The method for producing a molded article according to <5>, wherein a material temperature when the material is applied to the second closed mold is from 0.1 to 20° C. lower than a material temperature when the material is applied to the first closed mold.

<7> The method for producing a molded article according to <5> or <6>, wherein a difference between a mold temperature when molding is performed using the first closed mold and the material temperature when the material is applied to the second closed mold is from 30 to 340° C.

<8> The method for producing a molded article according to any one of <1> to <7>, wherein the material is heated and then applied to the first closed mold.

<9> The method for producing a molded article according to <8>, wherein the material is applied to the first closed mold by injection molding.

<10> The method for producing a molded article according to any one of <1> to <8>, wherein the material is a UD tape cut to a length of less than 30 mm, and the cut UD tape is applied to the first closed mold.

<11> The method for producing a molded article according to any one of <1> to <10>, wherein the thermoplastic resin includes a polyamide resin.

<12> The method for producing a molded article according to any one of <1> to <11>, wherein the thermoplastic resin includes a polyamide resin constituted from diamine-derived constituent units and dicarboxylic acid-derived constituent units; and 50 mol % or more of the diamine-derived constituent units are derived from xylylenediamine, and 50 mol % or more of the dicarboxylic acid-derived constituent units are derived from an α,ω-linear aliphatic dicarboxylic acid having from 4 to 20 carbons.

<13> The method for producing a molded article according to any one of <1> to <12>, wherein the thermoplastic resin includes a polyolefin resin.

<14> The method for producing a molded article according to any one of <1> to <13>, wherein the reinforcing fibers include at least one type selected from the group consisting of glass fibers and carbon fibers.

<15> The method for producing a molded article according to any one of <1> to <14>, wherein the number-average fiber length of the reinforcing fibers having a number average fiber length of less than 30 mm and included in the material is from 10 to 25 mm.

<16> The method for producing a molded article according to any one of <1> to <15>, wherein the number-average fiber length of the reinforcing fibers having a number-average fiber length of 1 mm or longer and included in the molded article is 1 mm or longer and less than 30 mm.

<17> The method for producing a molded article according to any one of <1> to <15>, wherein the number-average fiber length of the reinforcing fibers having a number-average fiber length of 1 mm or longer and included in the molded article is 10 mm or longer and less than 30 mm.

<18> The method for producing a molded article according to any one of <1> to <17>, wherein a mold temperature when molding is performed using the second closed mold is from 0.1 to 7° C. lower than the mold temperature when molding is performed using the first closed mold.

According to the present invention, a production method with which a molded article excelling in surface appearance can be produced is provided.

DETAILED DESCRIPTION

Contents of the present invention will be described in detail below. In the present specification, "from . . . to . . . " or "of . . . to . . . " is used to mean that the numerical values described before and after "to" are included as the lower limit and the upper limit, respectively.

The present invention provides a method for producing a molded article, the molded article containing a thermoplastic resin and reinforcing fibers having a number-average fiber length of 1 mm or longer, and the production method is characterized by including molding a material containing the thermoplastic resin and reinforcing fibers having a number-average fiber length of less than 30 mm using a first closed mold, and then molding only the molded material once again using a second closed mold. Through such a configuration, a molded article excelling in surface appearance can be obtained.

While merely an assumption, the mechanism is assumed to be as follows. That is, it was found that when a material containing a thermoplastic resin and reinforcing fibers with a length of less than 30 mm is molded, bending of the reinforcing fibers occurs, and the surface appearance is degraded. Furthermore, as a result of examinations performed by the present inventors, the present inventors discovered that, by molding a single material twice in a closed mold, the resin flow occurs in a vicinity of a surface layer of the molded article in the second molding, increasing dispersion of the reinforcing fibers, and alleviating bending of the reinforcing fibers. It is speculated that this leads to the solution of the problem described above.

Furthermore, as a result of the increased dispersion of the reinforcing fibers, the isotropic strength can also be increased.

The present invention will be described in detail below with reference to FIG. 1. Of course, the production method of the present invention is not limited to the embodiment of FIG. 1.

The present invention includes molding a material containing a thermoplastic resin and reinforcing fibers having a number-average fiber length of less than 30 mm, using a first closed mold. For example, as illustrated in FIG. 1(1) and FIG. 1(2), a material 2 containing a thermoplastic resin and reinforcing fibers having a number-average fiber length of less than 30 mm is applied to a first closed mold 1 and molded.

When the reinforcing fibers having a number-average fiber length of less than 30 mm are blended and kneaded in a thermoplastic resin and then molded, the reinforcing fibers tend to aggregate or bend in the obtained molded article, resulting in a degradation of appearance in the molded article. As a method to solve this problem, it is also conceivable to use reinforcing fibers with a shorter number average fiber length in the molded article, but this may result in a problem of inferior mechanical strength. In an embodiment of the present invention, while using a material containing a thermoplastic resin and reinforcing fibers having a number-average fiber length of less than 30 mm, molding is performed twice. Through this method, appearance is successfully improved while the number average fiber length is maintained as long as 1 mm or longer in the obtained molded article.

In an embodiment of the present invention, the shape of the molded article is substantially formed by molding in the first closed mold. The term 'closed mold' means a mold that is tightly sealed in all directions to the extent that the molten resin does not flow out of the mold during molding. The closed mold is preferably a mold having recesses and protrusions.

In the method of applying the material into the first closed mold, it is preferable that a fiber-reinforced resin material containing a thermoplastic resin, reinforcing fibers, and other components that are blended as necessary is heated, and then applied to the first closed mold. Furthermore, the material is preferably applied to the first closed mold in a molten state. Such a configuration of the method can improve molding cycle compared to a case of heating the material in the mold. Also, the material can be more uniformly heated compared to a case in which the material is placed in the mold and then heated.

Figure 1:
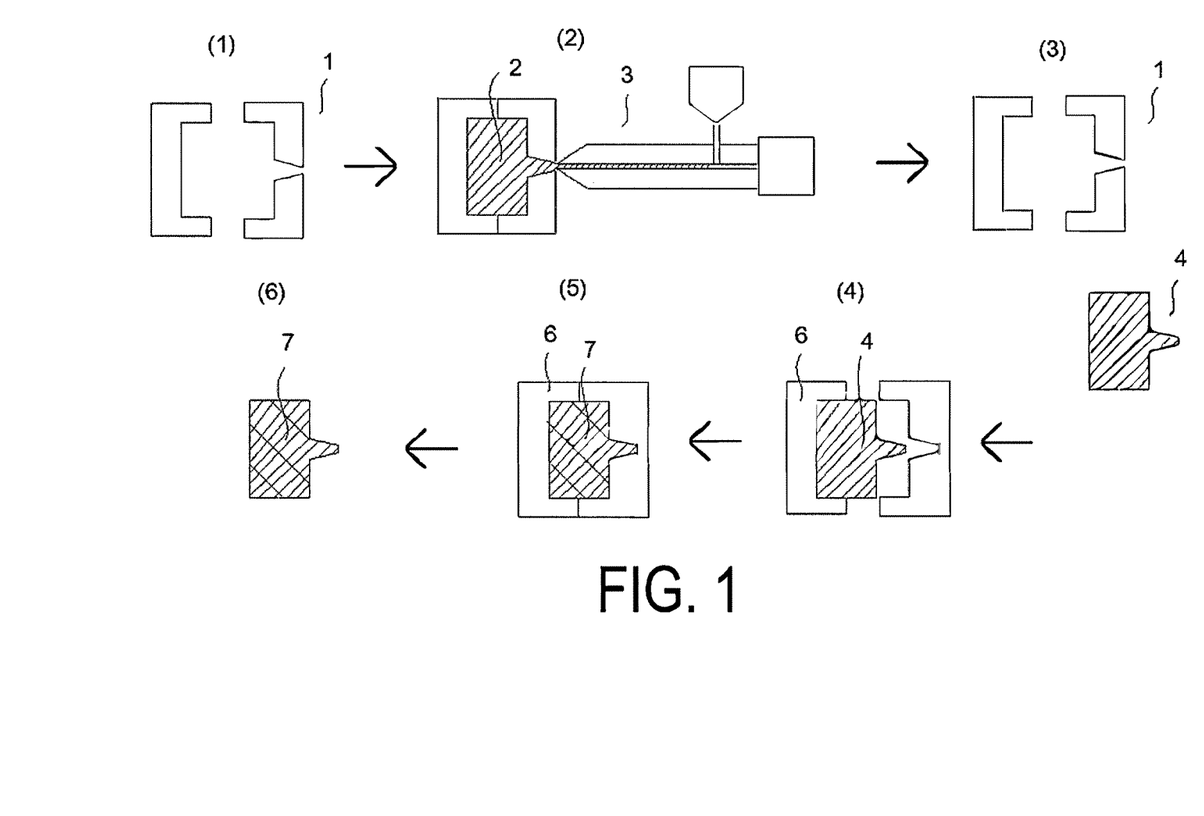
FIG. 1 is a schematic diagram illustrating an embodiment of a production method of the present invention.

An example includes, as illustrated in FIG. 1(2), a method of applying the material into the first closed mold by injection molding. In FIG. 1(2), reference numeral 3 indicates an injection molding machine. Injection molding may be performed by melting pellets prepared using the thermoplastic resin and reinforcing fibers serving as raw materials and other components that are blended as necessary and performing injection molding using the melt pellets, or it may be performed by directly melt-kneading the thermoplastic resin and reinforcing fibers serving as raw materials of the material, and other components that are blended as necessary and then performing injection molding.

Alternatively, a fiber-reinforced resin material in a shape such as a flat plate shape, a tape shape, or the like may be heated using an infrared heater or the like, and then applied to the first closed mold. Examples of fiber-reinforced resin materials such as flat plate-shaped and tape-shaped fiber-reinforced resin materials include UD tapes as well as random chopped sheets, mixed fiber nonwoven fabrics, and prepregs. Furthermore, they may also be fibrous, such as a mixed fiber yarn.

One embodiment of the material of the present invention includes a UD tape that is cut to a length of less than 30 mm and then used in a method including applying the cut UD tape to the first closed mold.

Details of the thermoplastic resin, details of the reinforcing fibers, and details of the other components used in the material will be described later.

When the first closed mold and the second closed mold are different molds, a temperature of the material when the material is applied to the first closed mold is preferably 150° C. or higher, more preferably 170° C. or higher, and even more preferably 220° C. or higher, and may be 250° C. or higher. When expressed as a relationship with the melting point (Tm), the temperature thereof is preferably equal to or higher than Tm−10° C. When the temperature of the material when applied to the first closed mold is set to the lower limit described above or higher, the material tends to fill the entire mold more favorably. The temperature of the material when applied to the second closed mold is preferably 340° C. or lower, more preferably 320° C. or lower, and even more preferably 310° C. or lower, and may be 300° C. or lower. When expressed as a relationship with the melting point (Tm), the temperature thereof is preferably equal to or lower than Tm+10° C. When the temperature of the material when applied to the second closure-type mold is set to the upper limit described above or lower, the reinforcing fibers in the material tend to be dispersed more favorably.

When the first closed mold and the second closed mold are the same mold, the temperature of the material when applied to the first closed mold is preferably 190° C. or higher, and more preferably 220° C. or higher. When expressed as a relationship with the glass transition temperature (Tg), the temperature of the material when applied to the first closure-type mold is preferably Tg ° C. or higher, and is more preferably Tg+10° C. or higher. When the temperature of the material when applied to the first closed mold is set to the lower limit described above or higher, the material tends to fill the entire mold more favorably. The temperature of the material when applied to the second closed mold is preferably 320° C. or lower and more preferably 300° C. or lower. When expressed as a relationship with the melting point (Tm), the temperature thereof is preferably equal to or lower than Tm+10° C., and more preferably equal to or lower than Tm. When the temperature of the material when applied to the second closure-type mold is set to the upper limit described above or lower, dispersibility of the reinforcing fibers in the material tends to improve further.

'The temperature of the material when applied to the first closed mold' refers to the temperature of the material just prior to application to the first closed mold, meaning the temperature of the molten resin. For example, in the case of injection molding, the temperature of the material is the maximum temperature of the cylinder.

When two or more types of thermoplastic resins are included, the temperature is determined in term of the mixture. The same applies to the other temperatures.

The first closed mold is preferably a press mold, and a mold that is adaptable to a high speed, temperature-adjustable electromagnetic induction heating system, or a Thermo Assisted Molding system is preferable. Furthermore, molds such as single-shot molds, transfer molds, and forward feeding molds that are suited for mass production are preferable. Other examples include molds that are divided into three, four, or more sections to enable molding of complex shapes. Furthermore, a mold for a hybrid molding machine in which an injection molding machine and a press molding machine are integrated is preferable. In addition, a high-speed temperature-adjustable system is preferably introduced into a hybrid molding machine.

The temperature of the first closed mold is preferably 20° C. or higher, more preferably 25° C. or higher, and even more preferably 28° C., and may be 35° C. or higher. When the temperature of the first closed mold is set to the lower limit temperature described above or higher, molding can be implemented at a higher cycle. Furthermore, the temperature of the first closed mold is preferably 340° C. or lower, more preferably 330° C. or lower, and even more preferably 320° C. or lower, and may be 250° C. or lower, 200° C. or lower, 70° C. or lower, 60° C. or lower, or 50° C. or lower. When the temperature of the first closed mold is set to the upper limit described above or lower, the dimensions of the molded article tend to be more stabilized.

The production method according to an embodiment of the present invention includes molding only the molded material, which has been molded using the first closed mold, once again using the second closed mold. For example, as illustrated in FIGS. 1(3) to (5), a molded article 4 molded in the first closed mold 1 is removed from the first closed mold 1 (FIG. 1(3)), applied to a second closed mold 6 (FIG. 1(4), and molded using the second closed mold (FIG. 1(5)). In this manner, when the molded article molded using the first closed mold is molded once again using the second closed mold, the fluidity of the thermoplastic resin near the surface layer of the molded article is improved, the reinforcing fibers are more effectively dispersed, and a molded article having more excellent surface appearance can be obtained. Note that "only the material" herein may be referred to the material from which a portion thereof has been removed. For example, when the material is molded in injection molding, the material may undergo a process involving removal of burrs from the molded article. The material is typically a material molded using the first closed mold, and only 90 mass % or more (preferably 98 mass % or more, and more preferably 99 mass % or more) of the material molded using the first closed mold is again molded using the second closed mold.

The shape of the second closed mold may be identical to that of the first closed mold, but is preferably different. By the use of a mold with a different shape, the thermoplastic resin may undergo softening, the reinforcing fibers are further dispersed, and the appearance is further improved. Note that, in the case of injection molding or the like, a flow channel (meaning a portion that does not remain in the final molded article, also called a sprue or runner) may be provided for injection of resin into a mold. In such a case, molds that differ only by the presence or lack of such a flow channel is considered to be of an identical type. That is, when a mold that lacks only the flow channel of the first closed mold is used as the second closed mold, these molds are considered to be identical. The final molded article here means a finished product, not a component. For example, even in a case in which a plurality of components are formed using one mold, a flow channel may be provided in the mold. However, such a flow channel is not included in the finished product obtained by assembling the components, and therefore is not a final molded article.

The molded article molded in the first closed mold is preferably heated before being applied to the second closed mold.

'The temperature of the material when applied to the second closed mold' refers to a temperature just prior to application of the material to the second closed mold, and it refers to a surface temperature of the material. The surface temperature of the material can be measured with a non-contact thermometer (e.g., an infrared radiometer).

When the first closed mold and the second closed mold are different molds, the temperature of the material when applied to the second closed mold is preferably 150° C. or higher, and more preferably 170° C. or higher. When the temperature of the material is set to the lower limit described above or higher, the resin undergoes melting, and the reinforcing fibers can be more effectively dispersed such that the resin can suitably follow variation in the shape. In addition, the temperature of the material when applied to the second closed mold is preferably 340° C. or lower, and more preferably 320° C. or lower, and may be 300° C. or lower or 280° C. or lower. When the temperature of the material is set to the upper limit described above or lower, a deterioration in dispersibility of the reinforcing fibers due to excessive flow of the resin can be more effectively suppressed.

When the first closed mold and the second closed mold are the same mold, the temperature of the material when applied to the second closed mold is preferably 150° C. or higher, and more preferably 200° C. or higher. When the temperature of the material is set to the lower limit described above or higher, the resin undergoes softening, and the reinforcing fibers can be dispersed with a higher degree of dispersion. In addition, the temperature of the material when applied to the second closed mold is preferably 340° C. or lower and more preferably 320° C. or lower. When the temperature of the material is set to the upper limit described above or lower, a deterioration in dispersibility of the reinforcing fibers due to excessive flow of the resin can be more effectively suppressed.

Moreover, in a case where the first and second closed molds are different molds, the difference between the mold temperature when the material is molded using the first closed mold and the material temperature when the material is applied to the second closed mold is preferably 20° C. or higher, and more preferably 30° C. or higher, and may be 100° C. or higher or 120° C. or higher. In addition, the temperature difference is preferably 340° C. or lower, and more preferably 320° C. or lower, and may be 300° C. or lower or 290° C. or lower. When the temperature difference is set to the range described above, exposure of the reinforcing fibers on the surface during shaping can be more effectively suppressed.

Moreover, in a case where the first and second closed molds are the same molds, the difference between the mold temperature when the material is molded using the first closed mold and the material temperature when the material is applied to the second closed mold is preferably 30° C. or higher, more preferably 40° C. or higher, and even more preferably 50° C. or higher, and may be 100° C. or higher or 120° C. or higher. In addition, the temperature difference is preferably 340° C. or lower, and more preferably 320° C. or lower, and may be 300° C. or lower or 290° C. or lower. When the temperature difference is set to the range described above, continuous moldability tends to be better.

Furthermore, in an embodiment of the present invention, in a case where the first closed mold and the second closed mold are different molds, the material temperature when the material is applied to the second closed mold is preferably at least 0.1° C. lower, more preferably at least 0.5° C. lower, and even more preferably at least 1° C. lower, than the material temperature when the material is applied to the first mold. The difference in material temperatures is preferably 7° C. or lower, more preferably 6° C. or lower, even more preferably 5° C. or lower, yet even more preferably 4° C. or lower, still even more preferably 3° C. or lower, and further preferably 2° C. or lower. With such a configuration, oxidation degradation of the resin can be more effectively reduced. The material temperature refers to the temperature of the resin contained in the material.

Furthermore, in an embodiment of the present invention, in a case where the first closed mold and the second closed mold are the same molds, the material temperature when the material is applied to the second closed mold is preferably at least 0.1° C. lower, more preferably at least 0.5° C. lower, and even more preferably at least 1° C. lower, than the material temperature when the material is applied to the first mold. The difference in material temperatures is preferably 20° C. or lower, more preferably 10° C. or lower, even more preferably 7° C. or lower, yet even more preferably 5° C. or lower, still even more preferably 3° C. or lower, and further preferably 2° C. or lower. With such a configuration, oxidation degradation of the resin can be more effectively reduced. The material temperature refers to the temperature of the resin contained in the material.

The second closed mold is preferably a press mold, and a mold that is adaptable to a high speed, temperature-adjustable electromagnetic induction heating system, or a Thermo Assisted Molding system is preferable. Furthermore, molds such as single-shot molds, transfer molds, and forward feeding molds that are suited for mass production are preferable. Other examples include molds that are divided into three, four, or more sections to enable molding of complex shapes. Furthermore, a mold for a hybrid molding machine in which an injection molding machine and a press molding machine are integrated is preferable.

The temperature of the second closed mold is preferably 10° C. or higher, and more preferably 20° C. or higher. When the temperature of the second closed mold is set to the lower limit described above or higher, the dispersibility of the fibers tends to further improve. In addition, the temperature of the material when the material is applied to the second closed mold is preferably 200° C. or lower and more preferably 150° C. or lower. By setting the temperature thereof to the upper limit described above or lower, the dimensions of the molded article tend to be more stabilized.

The material temperature refers to the temperature of the resin contained in the material.

Furthermore, in an embodiment of the present invention, the mold temperature during molding using the second closed mold is preferably at least 0.1° C. lower than the mold temperature during molding using the first closed mold, is more preferably at least 0.5° C. lower therefrom, and is more preferably at least 1° C. lower therefrom. The difference in mold temperatures is preferably 7° C. or lower, more preferably 6° C. or lower, even more preferably 5° C. or lower, yet even more preferably 4° C. or lower, still even more preferably 3° C. or lower, and further preferably 2° C. or lower. With such a configuration, the appearance of the molded article tends to improve.

After molding with the second closed mold (FIG. 1(5)), a molded article 7 is removed from the second closed mold 6 (FIG. 1(6)). Subsequently, the molded article 7 may be further molded using a third closed mold. In such a case, the molding material may be only the molded article obtained from the second closed mold, or the molded article obtained from the second closed mold may be combined with another material and molded.

Furthermore, a molded article having a more complex shape can be obtained using an open mold or using a combination with another molding method.

The shape of the molded article (in particular, a molded article that is molded after molded using the second closed mold) molded by the production method according to an embodiment of the present invention is not particularly limited, and can be selected, as appropriate, according to the application and purpose of the molded article. Examples of the shape include a board shape, a plate shape, a rod shape, a sheet shape, a film shape, cylindrical, annular, circular, elliptical, a gear shape, polygonal, a heteromorphic article, a hollow-shaped article, a frame shape, a box shape, and a panel shape.

The fields of application of the molded articles described above are not particularly limited, and the molded articles can be widely used in applications such as components for automobiles and other such transportation devices, general mechanical components, precision mechanical components, electronic and electrical device components, OA device components, building materials and building-related components, medical devices, leisure sporting goods, gaming devices, medical products, household goods such as food packaging films, and defense and aerospace products.

<Thermoplastic Resin>

Next, the thermoplastic resin fibers used in the present invention are described. The thermoplastic resin used in the molded article is not particularly limited as long as it is a thermoplastic resin, but is preferably selected from a polyamide resin, a polycarbonate resin, a polyester resin, a polyolefin resin, a styrene-based resin, a polyethylene resin, an acrylic resin, and a thermoplastic polyimide resin. Among these, the thermoplastic resin is more preferably at least one selected from the group consisting of polyamide resins and polyolefin resins, and is more preferably a polyamide resin.

<<Polyamide Resin>>

In the present invention, the thermoplastic resin preferably includes a polyamide resin, and 90 mass % or more of the thermoplastic resin may be a polyamide resin.

The polyamide resin is a polymer including, as at least one constituent unit, an acid amide obtained by ring-opening polymerization of a lactam, polycondensation of an aminocarboxylic acid, or polycondensation of a diamine and a dicarboxylic acid, and examples specifically include polyamide 6, 11, 12, 46, 66, 610, 612, 6I, 6/66, 6T/6I, 6/6T, 66/6T, 66/6T/6I, and 9T, polyamide XD6, polyamide XD10, polyamide XD12, poly(trimethylhexamethylene terephthalamide), poly bis(4-aminocyclohexyl)methane dodecamide, poly bis(3-methyl-4-aminocyclohexyl)methane dodecamide, and poly(undecamethylene hexahydroterephthalamide). "I" described above denotes an isophthalic acid component, "T" denotes a terephthalic acid component, and "XD" denotes a xylylenediamine component. In addition, for the polyamide resin, reference can be made to the disclosures in paragraphs [0011] to [0013] of JP 2011-132550 A, the contents of which are incorporated herein by reference.

The polyamide resin used in an embodiment of the present invention is constituted of a diamine-derived constituent unit and a dicarboxylic acid-derived constituent unit, and is preferably a xylylenediamine-based polyamide resin in which 50 mol % or more of the diamine-derived constituent units are derived from xylylenediamine and 50 mol % or more of the dicarboxylic acid-derived constituent units are derived from an α,ω-linear aliphatic dicarboxylic acid having from 4 to 20 carbons.

Of the diamine-derived constituent units of the xylylenediamine-based polyamide resin, more preferably 70 mol % or more, even more preferably 80 mol % or more, still more preferably 90 mol % or more, and still even more preferably 95 mol % or more are derived from at least one of m-xylylenediamine or p-xylylenediamine.

Of the dicarboxylic acid-derived constituent units of the xylylenediamine-based polyamide resin, preferably 70 mol % or more, more preferably 80 mol % or more, even more preferably 90 mol % or more, and still more preferably 95 mol % or more are derived from an α,ω-linear aliphatic dicarboxylic acid having from 4 to 20 carbons. For the α,ω-linear aliphatic dicarboxylic acid having from 4 to 20 carbons, adipic acid, sebacic acid, suberic acid, dodecanedioic acid, eicodione acid, or the like can be suitably used, and adipic acid and sebacic acid are more preferred.

Examples of the diamine that can be used as a raw material diamine component of the xylylenediamine-based polyamide resin, other than m-xylylenediamine and p-xylylenediamine, include aliphatic diamines, such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine, and 2,4,4-trimethylhexamethylenediamine; alicyclic diamines, such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having an aromatic ring, such as bis(4-aminophenyl)ether, p-phenylenediamine, and bis(aminomethyl)naphthalene. One of these can be used alone, or two or more can be mixed and used.

Examples of the dicarboxylic acid component other than the α,ω-linear aliphatic dicarboxylic acid having from 4 to 20 carbon atoms include phthalic acid compounds, such as isophthalic acid, terephthalic acid, and orthophthalic acid; naphthalenedicarboxylic acid isomers, such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid. One of these can be used alone, or two or more types can be mixed and used.

The polyamide resin used in an embodiment of the present invention is constituted by, as main components, a constituent unit derived from a diamine and a constituent unit derived from a dicarboxylic acid, but constituent units other than these are not entirely excluded, and of course, the polyamide resin may contain a constituent unit derived from a lactam such as ε-caprolactam or laurolactam, or from an aliphatic aminocarboxylic acid such as aminocaproic acid and aminoundecanoic acid. Here, the term "main component" indicates that, of the constituent units constituting the polyamide resin, the total number of the constituent units derived from a diamine and the constituent units derived from a dicarboxylic acid is the largest among all the constituent units. In the present invention, the total of the constituent units derived from a diamine and the constituent units derived from a dicarboxylic acid in the polyamide resin preferably accounts for 90 mass % or more and more preferably 95 mass % or more of all the constituent units.

In an embodiment of the present invention, the melting point of the polyamide resin is preferably from 150 to 310° C., and more preferably from 180 to 300° C.

Furthermore, the lower limit of the glass transition temperature of the polyamide resin is preferably 40° C. or higher, more preferably 50° C. or higher, even more preferably 55° C. or higher, and particularly preferably 60° C. or higher. When the glass transition temperature is in this range, thermal resistance tends to be favorable. An upper limit of the glass transition temperature of the polyamide resin is preferably 150° C. or lower, more preferably 110° C. or lower, and even more preferably 100° C. or lower. When the glass transition temperature is in this range, thermal resistance tends to be favorable.

Note that the "melting point" refers to a temperature at which an endothermic peak reaches its maximum during a temperature increase when observed by a differential scanning calorimetry (DSC) method. Moreover, the "glass transition temperature" is determined by a measurement in which, after a sample has been heated and melted once so that thermal history effects on crystallinity has been eliminated, the sample was heated again. For the measurement, a DSC apparatus may be used to determine the melting point from the temperature at which the endothermic peak reaches its maximum. The endothermic peak is observed when approximately 5 mg of a sample is melted by heating from room temperature (25° C.) to a temperature that is equal to or higher than an expected melting point at a temperature increase rate of 10° C./min while nitrogen is streamed at 30 mL/min as the atmosphere gas. Next, the melted polyamide resin is rapidly cooled using dry ice, and then the temperature is increased again to a temperature equal to or higher than the melting point at the rate of 10° C./min, and the glass transition temperature can be determined.

As the DSC apparatus, for example, the "DSC-60" available from Shimadzu Corporation can be used.

<<Polyolefin Resin>>

In an embodiment of the present invention, the thermoplastic resin preferably includes a polyolefin resin, and 90 mass % or more of the thermoplastic resin may be a polyolefin resin.

The polyolefin resin is not particularly defined, and a known polyolefin resin can be used. Specific examples of the polyolefin resin include the polyolefin resins described in paragraphs [0101] to [0103] of JP 2014-068767 A, the contents of which are incorporated herein.

The polyolefin resin is preferably one or more types selected from the group consisting of cycloolefin-based polymers and polypropylene-based polymers (PP), and is more preferably a polypropylene-based polymer.

The cycloolefin-based polymer may be a cycloolefin polymer (COP) or a cycloolefin copolymer (COC).

The COP is, for example, a polymer in which norbornene is subjected to ring-opening polymerization and hydrogenation. COP is described, for example, in JP H5-317411 A, and is commercially available as ZEONEX (trade name) or ZEONOR (trade name) available from Zeon Corporation, or as Daikyo Resin CZ (trade name) available from Daikyo Seiko, LTD.

Examples of the COC include copolymers made from olefins such as norbornene and ethylene as raw materials, and copolymers made from olefins such as tetracyclododecene and ethylene as raw materials. COC is commercially available as, for example, Apel (trade name), available from Mitsui Chemicals, Inc.

Known polymers such as propylene homopolymers, propylene-ethylene block copolymers, and propylene-ethylene random copolymers can be used as the PP. Commercially available products include Bormed RB845MO available from Borealis AG.

The material and molded article of an embodiment of the present invention contain the thermoplastic resin at a total of preferably 30 mass % or higher, more preferably 40 mass % or higher, and even more preferably 50 mass % or higher. In addition, the material and molded article of an embodiment of the present invention contain the thermoplastic resin at a total of preferably 95 mass % or less, more preferably 90 mass % or less, even more preferably 80 mass % or less, and still more preferably 70 mass % or less.

One type of thermoplastic resin may be used alone, or two or more types of thermoplastic resins may be used. When two or more types are used, the total content is in the above range.

<Reinforcing Fibers>

The material and molded article of the present invention contain reinforcing fibers. In an embodiment of the present invention, the reinforcing fibers included in the material and the molded article are the same, but due to breakage of the reinforcing fibers during molding, the fiber length of the reinforcing fibers is typically shortened. On the other hand, the fiber diameter of the reinforcing fibers is relatively resistant to change even when molded.

The reinforcing fibers used in an embodiment of the present invention may be organic reinforcing fibers or inorganic reinforcing fibers, and inorganic reinforcing fibers are preferable. Examples of the reinforcing fibers include plant fibers, carbon fibers, glass fibers, alumina fibers, boron fibers, ceramic fibers, and aramid fibers, and the reinforcing fibers preferably include at least one type of the group consisting of glass fibers and carbon fibers, and more preferably include glass fibers.

As the glass fibers, fibers obtained by melt spinning glass such as E glass, C glass, A glass, S glass, and alkali-resistant glass, which are available generally, are used, but as long as the fibers can be formed into glass fibers, such glass fibers can be used, and the type of glass fibers is not particularly limited. In an embodiment of the present invention, the glass fibers preferably include E glass.

The glass fibers are preferably surface-treated with a surface treatment agent, such as a silane coupling agent, such as γ-methacryloxypropyltrimethoxysilane, γ-glycidoxypropyltrimethoxysilane, and γ-aminopropyltriethoxysilane. The deposition amount of the surface treatment agent is preferably from 0.01 to 1 mass % of the glass fibers. Furthermore, optionally, glass fibers surface-treated with a lubricant, such as a fatty acid amide compound and a silicone oil; an antistatic agent, such as a quaternary ammonium salt; a resin having film-forming ability, such as an epoxy resin and a urethane resin; or a mixture containing components, such as a resin having film-forming ability, a thermal stabilizer, and a flame retardant; can be used.

The glass fibers used in the present invention can be obtained as commercially available products. Commercially available products include, for example, T257H, T286H, T756H, T289, T289DE, T289H, and T296GH available from Nippon Electric Glass Co., Ltd.; DEFT2A available from Owens Corning; HP3540 available from PPG Industries, Inc.; CSG3PA-810S and CSG3PA-820 available from Nitto Boseki Co., Ltd.; and EFH50-31 available from Central Glass Co., Ltd. (all product names are trade names).

The carbon fibers are preferably a polyacrylonitrile-based carbon fiber or a pitch-based carbon fiber. Additionally, carbon fibers of plant-derived raw materials, such as lignin and cellulose, can also be used.

The cross section of the reinforcing fibers used in an embodiment of the present invention may be circular or non-circular.

The reinforcing fibers used in an embodiment of the present invention have a number-average fiber length of less than 30 mm in the material. A lower limit of the number-average fiber length of the reinforcing fibers in the material is preferably not less than 1 mm and more preferably not less than 10 mm. An upper limit of the number-average fiber length of the reinforcing fibers in the material is preferably not greater than 25 mm, and may be not greater than 20 mm or not greater than 18 mm. When the molded article is molded using short fibers or long fibers, a deterioration in appearance caused by the reinforcing fibers in the molded article has been a frequent problem, but through the present invention, this problem can be effectively avoided.

Furthermore, the reinforcing fibers in the material preferably have a number-average fiber diameter of 0.1 μm or more, more preferably 0.5 μm or more, and even more preferably 1.0 μm or more. An upper limit of the number-average fiber diameter is preferably 50 μm or less, more preferably 30 μm or less, and even more preferably 20 μm or less.

On the other hand, with the reinforcing fibers used in the present invention, a number-average fiber length of the reinforcing fibers in the molded article is 1 mm or longer, and preferably 1.5 mm or longer, and may be 10 mm or longer depending on the application. An upper limit of the number-average fiber length is less than 30 mm, and depending on the application, may be 10 mm or less, 5 mm or less, or 3 mm or less. When the number-average fiber length of the reinforcing fibers in the molded article is set to 1 mm or longer, the strength of the obtained molded article can be increased. Furthermore, when the number-average fiber length of the reinforcing fibers in the molded article is set to less than 30 mm, the appearance of the obtained molded article can be further improved.

For example, when the material is a pellet, the number-average fiber length of the reinforcing fibers in the molded article is preferably not smaller than 1 mm and less than 30 mm, more preferably from 1 to 5 mm, even more preferably from 1 to 3 mm, yet even more preferably from 1.5 to 3 mm, and still even more preferably from 1.5 to 2.5 mm.

In addition, when the material is formed by cutting a UD tape, the number-average fiber length of the reinforcing fibers in the molded article is preferably not smaller than 10 mm to less than 30 mm, and more preferably from 10 to 25 mm.

In the material and molded article of an embodiment of the present invention, a proportion of reinforcing fibers is preferably from 20 to 80 vol. %, more preferably from 30 to 70 vol. %, and even more preferably from 35 to 65 vol. %.

In addition, a total content of reinforcing fibers in the material and molded article of the present invention is preferably 5 mass % or more, more preferably 10 mass % or more, even more preferably 20 mass % or more, and yet even more preferably 30 mass % or more. Furthermore, the total content of reinforcing fibers in the material and molded article of the present invention is preferably 70 mass % or less, more preferably 60 mass % or less, and even more preferably 50 mass % or less.

One type of reinforcing fibers may be used, or two or more types of reinforcing fibers may be used. When two or more types of reinforcing fibers are used, the total content is in the above range.

<Other Components>

The material used in the present invention may contain other components besides the thermoplastic resin reinforcing fibers.

Examples of other components include additives such as nucleating agents, mold release agents, flame retardants, flame retardant aids, thermal stabilizers, photostabilizers, fluorescent brighteners, anti-dripping agents, antistatic agents, anti-fogging agents, anti-blocking agents, fluidity modifiers, plasticizers, dispersants, antibacterial agents, and coloring agents. For details on these other components, refer to the description in paragraphs [0130] to [0155] of JP 4894982 B, the contents of which are incorporated in the present specification.

A total of the other components in the material is preferably from 0 to 20 mass %. A single type of these other components may be used alone, or two or more types may be used in combination. When two or more types are used, the total amount thereof is preferably within the above range.

EXAMPLES

The present invention will be described more specifically with reference to examples below. Materials, amounts used, ratios, processing details, processing procedures, and the like described in the following examples can be changed as appropriate as long as they do not depart from the spirit of the present invention. Thus, the scope of the present invention is not limited to the specific examples described below.

Raw Materials

MXD6: m-xylylene adipamide resin, grade 56011, available from Mitsubishi Gas Chemical Company, Inc., melting point: 237° C., glass transition temperature: 85° C.

MP10: A polyamide resin synthesized according to the synthesis example described below.

PA6: polyamide 6, 1024B, available from Ube Industries, Ltd., melting point: 224° C., glass transition temperature: 50° C.

PP: polypropylene resin, grade FY6 available from Mitsubishi Chemical Corporation, melting point: 165° C., glass transition temperature: 0° C.

PA66: polyamide 66, CM3001N available from Toray Industries, Inc., melting point: 265° C., glass transition temperature: 50° C.

9T: polyamide 9T, A1000 available from Kuraray Co., Ltd., melting point: 289° C., glass transition temperature: 120° C.

MP10 Synthesis Example

A reaction vessel equipped with a stirrer, a partial condenser, a total condenser, a thermometer, a dropping funnel, a nitrogen introduction tube, and a strand die was charged with 10 kg (49.4 mol) of sebacic acid (TA grade, available from Itoh Oil Chemicals Co., Ltd.) and 11.66 g of sodium acetate/sodium hypophosphite monohydrate (molar ratio=1/1.5), and after sufficient nitrogen purging, the mixture was heated to 170° C. and melted while the system was stirred under a small nitrogen stream.

Under stirring, 6.647 kg of a mixed xylylenediamine (34.16 mol of m-xylylenediamine, 14.64 mol of p-xylylenediamine) in which the molar ratio of m-xylylenediamine (available from Mitsubishi Gas Chemical Company, Inc.) and p-xylylenediamine (available from Mitsubishi Gas Chemical Company, Inc.) was 70/30 was added dropwise to the molten sebacic acid, and the internal temperature was continuously increased to 240° C. over a period of 2.5 hours while condensation water that was generated was discharged outside of the system.

After dropwise addition was completed, the internal temperature was increased, and when the temperature reached 250° C., the pressure inside the reaction vessel was reduced. The internal temperature was then further increased, and a melt polycondensation reaction was continued for 20 minutes at 255° C. Next, the inside of the system was pressurized with nitrogen, and the obtained polymer was removed from the strand die and pelletized to obtain a polyamide resin (MP10). The melting point of the obtained MP10 was 213° C., and the glass transition temperature was 63° C.

Glass fibers (continuous fibers): ECDE150 1/0 1.0Z, available from Nitto Boseki Co., Ltd.

Carbon fibers: TR50S-12K, available from Mitsubishi Chemical Corporation, number-average fiber diameter: 7 μm <Production of Long Fiber Pellets>

Continuous glass fiber bundles (rovings) were passed through an impregnating die while being opened and drawn, and were impregnated with a molten thermoplastic resin supplied to the impregnating die, after which long glass fiber-reinforced thermoplastic resin pellets having a reinforcing fiber content of 50 mass % and a length of 15 mm were produced according to a pultrusion molding method of shaping, cooling, and cutting. The number-average fiber length of the reinforcing fibers obtained by this method was equal to the number-average length of the pellets.

<Production of UD Tape>

Rolls of continuous glass fiber bundles (rovings) 22 were evenly spaced apart and aligned, and then passed through a spreader and spread to a width of 200 mm. When the spread glass fibers were inserted between two upper and lower impregnating rolls, a thermoplastic resin melted by a twin screw extruder (TEM26SX, available from Toshiba Machine Co., Ltd.) was supplied, and the glass fibers were impregnated with the thermoplastic resin in the impregnating rolls. The orientation direction of the glass fibers was adjusted by adjusting the number of spreaders and the tension at which the glass fibers were drawn. Subsequently, while being cooled by a cooling roller, the glass fibers were continuously drawn for a length of 50 m and wound onto a cylindrical core material, and a UD tape was obtained. The temperature of the extruder was set to 280° C. The obtained UD tape was 20 cm wide with an average thickness of 220 μm and a length of 50 m.

Examples 1 to 6, 8 and 9

As the molding machine, the VPM1013H available from Sato Iron Works Co., Ltd. was used. As the first closed mold, a mold configured to mold a flat plate and having a depth of 2 mm, a length of 100 mm, and a width of 40 mm was used. As the second closed mold, a mold configured to mold a flat plate and having a depth of 5 mm, a length of 98 mm, and a width of 38 mm was used. However, in Example 9, the same type of mold as that of the first closed mold was used as the second closed mold.

The long fiber pellets obtained above were dried for 3 hours at 120° C., and then injection molded into the first closed mold in the molding machine (VPM1013H) at the material temperature (maximum temperature of the cylinder) shown in the tables below. At this time, the first closed mold temperature was the temperature shown in the tables below.

After the molded article was removed from the first closed mold, the molded article obtained using the first closed mold was heated with an infrared heater. After the material temperature of the molded article reached the value shown in the tables below, the molded article was placed in the second closed mold and molded at the second closed mold temperature shown in the tables.

The number-average fiber length of the reinforcing fibers in the molded article, the surface appearance, and the isotropic strength were evaluated for the obtained molded article.

<Number-Average Fiber Length of Reinforcing Fibers in the Material>

The number-average fiber length of the reinforcing fibers in the material was determined by incinerating 5 g of the material for 30 minutes at 400° C., observing the remaining reinforcing fibers using an optical microscope, and then calculating the average value.

<Number-Average Fiber Length of Reinforcing Fibers in the Molded Article>

The number-average fiber length of the reinforcing fibers in the obtained molded article was determined by cutting out a 10 mm×10 mm area from the molded article, incinerating for 30 minutes at 400° C., observing the remaining reinforcing fibers using an optical microscope, and then calculating the average value.

<Appearance>

An X-ray image of the surface of the molded article was measured using a CT scanner (TDM 1000H-II available from Yamato Scientific Co., Ltd.). The images were analyzed using the image analysis software Azo-Kun (available from Asahi Kasei Engineering Corporation).

A: Minimal or no disorder
B: Slight disorder
C: Significant disorder

<Isotropic Strength>10 mm×30 mm strip pieces were cut from a planar portion of the molded article in directions of 0 degrees, 45 degrees, 90 degrees, and 135 degrees with respect to the long side. Using a strograph available from Toyo Seiki Kogyo Co., Ltd., the flexural strength was measured at a measurement temperature of 23° C., a measurement humidity of 50% RH (relative humidity), a distance between chucks of 24 mm, and a speed of 2 mm/min. The relationship between the cut-out direction and the mechanical properties was evaluated.

A: Almost isotropic or completely isotropic
B: At a level for practical use but slightly inferior in isotropy
C: Insufficient level for practical use Comparative Example 1

Molding was performed in the same manner as in Example 1 with the exception that molding was not performed using the second closed mold. That is, the number-average fiber length of the reinforcing fibers in the molded article, the surface appearance, and the isotropic strength of the molded article were evaluated for the molded article removed from the first closed mold.

Example 7

The same molding machine, first closed mold, and second closed mold as those in Example 1 were used.

The UD tape obtained above was cut to a length of 2 cm and heated with an infrared heater, and after the material temperature reached the temperature shown in the following table, the UD tape was randomly placed in the first closed mold, and was molded at the first closed mold temperature shown in the table. The molded article obtained using the first closed mold was removed from the first closed mold, and burrs were removed, after which the molded article was heated with an infrared heater. After the material temperature of the molded article reached the temperature shown in the table below, the molded article was placed in the second closed mold and molded at the second closed mold temperature shown in the table below.

The number-average fiber length of the reinforcing fibers in the molded article, the surface appearance, and the isotropic strength were evaluated for the obtained molded article.

Comparative Example 2

Molding was implemented in the same manner as in Example 7 with the exception that molding was not performed using the second closed mold. That is, the number-average fiber length of the reinforcing fibers in the molded article, the surface appearance, and the isotropic strength of the molded article were evaluated for the molded article removed from the first closed mold.

TABLE 1

|  | Example 1 | Example 2 | Example 3 | Example 4 | Example 5 | Example 6 |
| --- | --- | --- | --- | --- | --- | --- |
| Thermoplastic resin | MXD6 | MP10 | PA6 | PP | PA66 | 9T |
| Reinforcing fibers | Glass fiber | Glass fiber | Glass fiber | Glass fiber | Glass fiber | Glass fiber |
| Material form | Injection molding from pellets | Injection molding from pellets | Injection molding from pellets | Injection molding from pellets | Injection molding from pellets | Injection molding from pellets |
| Number of times of molding with a mold | 2 | 2 | 2 | 2 | 2 | 2 |
| Material temperature (° C.) when applying to first closed mold | 290 | 280 | 275 | 180 | 290 | 320 |
| Mold temperature (° C.) of first closed mold | 45 | 45 | 40 | 30 | 40 | 45 |
| Material temperature (° C.) when applying to second closed mold | 285 | 275 | 270 | 177 | 285 | 318 |
| Mold temperature (° C.) of second closed mold | 43 | 43 | 35 | 29 | 37 | 43 |
| Number-average fiber length (mm) of reinforcing fibers in material | 15 | 15 | 15 | 15 | 15 | 15 |
| Number-average fiber length (mm) of reinforcing fibers in molded article | 2 | 2.1 | 1.8 | 2.1 | 2 | 1.9 |
| Shapes of first and second molds | Different | Different | Different | Different | Different | Different |
| Surface appearance | A | A | A | A | A | A |
| Isotropic strength | A | A | A | A | A | A |

TABLE 2

|  | Example 7 | Example 8 | Example 9 | Comparative Example 1 | Comparative Example 2 |
| --- | --- | --- | --- | --- | --- |
| Thermoplastic resin | MXD6 | MXD6 | MXD6 | PA6 | PA6 |
| Reinforcing fibers | Glass fiber | Carbon fiber | Glass fiber | Glass fiber | Glass fiber |
| Material form | UD Tape | Injection molding from pellets | Injection molding from pellets | Injection molding from pellets | UD Tape |
| Number of times of molding with a mold | 2 | 2 | 2 | 1 | 1 |
| Material temperature (° C.) when applying to first closed mold | 300 | 290 | 290 | 280 | 300 |
| Mold temperature (° C.) of first closed mold | 150 | 45 | 45 | 40 | 40 |
| Material temperature (° C.) when applying to second closed mold | 295 | 285 | 289 |  |  |
| Mold temperature (° C.) of second closed mold | 145 | 43 | 43 |  |  |
| Number-average fiber length (mm) of reinforcing fibers in material | 20 | 15 | 15 | 15 | 20 |
| Number-average fiber length (mm) of reinforcing fibers in molded article | 20 | 1.9 | 2 | 1.9 | 20 |
| Shapes of first and second molds | Different | Different | Same |  |  |
| Surface appearance | A | A | B | C | C |
| Isotropic strength | A | A | B | C | C |

As is clear from the above results, the molded articles obtained by the production method of the present invention had excellent surface appearance. The isotropic strength was also high.

Figure 2:
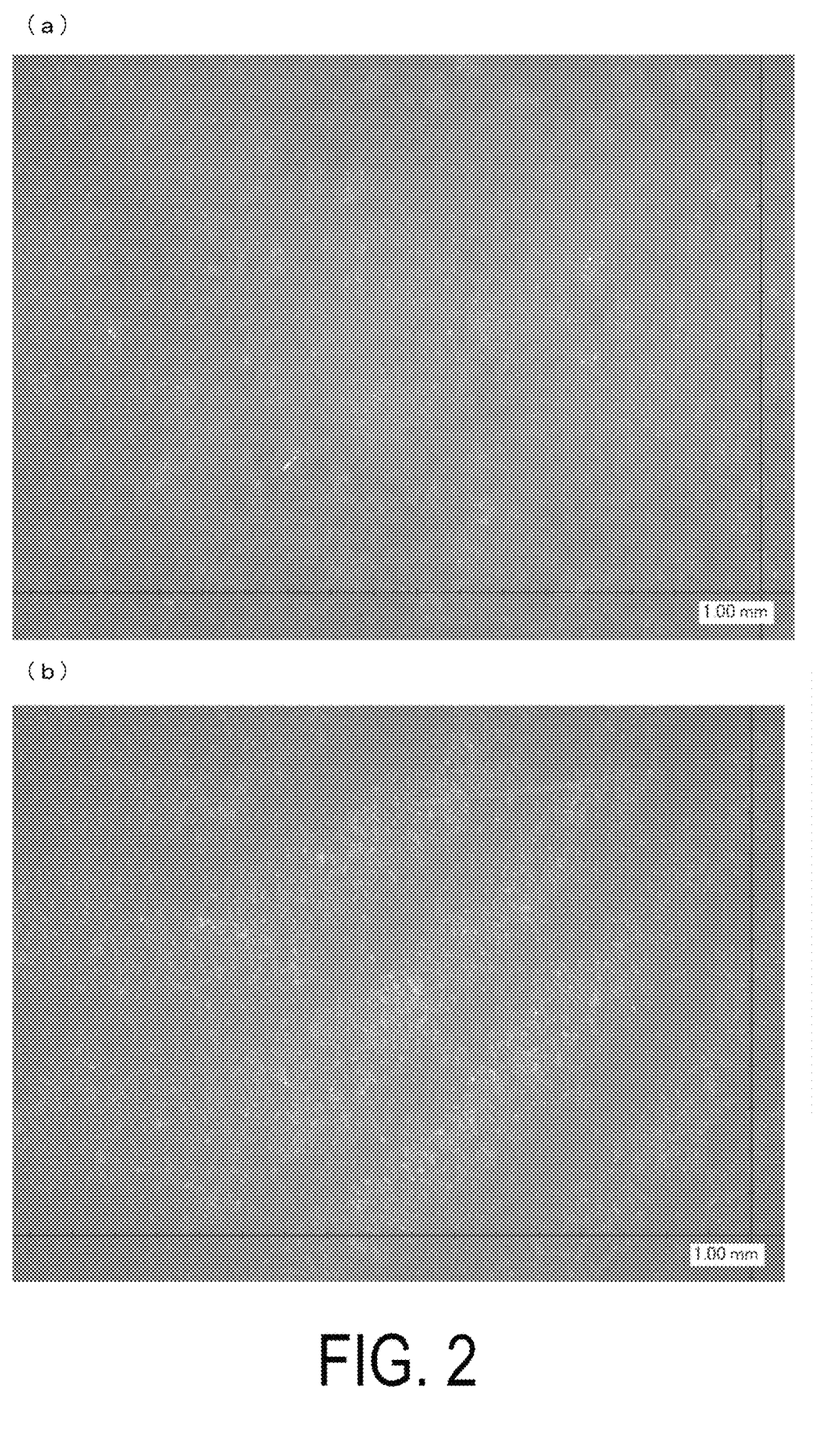
FIG. 2 is photomicrographs of surfaces of molded articles obtained in Example 1 and Comparative Example 1.

Furthermore, FIG. 2 shows electron photomicrographs of the appearance of the molded articles obtained in Example 1 and Comparative Example 1. FIG. 1(a) is a photograph of the molded article of Example 1, and it clear that the reinforcing fibers were dispersed. In contrast, FIG. 1(b) is a photograph of the molded article of Comparative Example 1, and in this photograph, a striped pattern is visible, and it is clear that the reinforcing fibers were not sufficiently dispersed.

1 First closed mold
2 Material
3 Injection molding machine
4 Molded article molded using first closed mold
6 Second closed mold
7 Molded article molded using second closed mold

The invention claimed is:

1. A method for producing a molded article, the molded article comprising a thermoplastic resin and reinforcing fibers having a number-average fiber length of 1 mm or longer, the method comprising:
   molding in a first closed mold a material containing the thermoplastic resin and reinforcing fibers having a number-average fiber length of less than 30 mm;
   after molding with the first closed mold, removing only the molded article molded in the first closed mold from the first closed mold;
   applying only the molded article molded from the first closed mold to a second closed mold which is a different mold than the first closed molded; and
   then molding only the molded material once again in the second closed mold;
   wherein a shape of the second closed mold is identical to a shape of the first closed mold.

2. The method for producing a molded article according to claim 1, wherein a shape of the second closed mold differs from a shape of the first closed mold.

3. The method for producing a molded article according to claim 2, wherein a material temperature when the material is applied to the second closed mold is from 0.1 to 7° C. lower than a material temperature when the material is applied to the first closed mold.

4. The method for producing a molded article according to claim 3, wherein a difference between a mold temperature when molding is performed using the first closed mold and a material temperature when the material is applied to the second closed mold is from 20 to 320° C.

5. The method for producing a molded article according to claim 2, wherein a difference between a mold temperature when molding is performed using the first closed mold and a material temperature when the material is applied to the second closed mold is from 20 to 320° C.

6. The method for producing a molded article according to claim 1, wherein a material temperature when the material is applied to the second closed mold is from 0.1 to 20° C. lower than a material temperature when the material is applied to the first closed mold.

7. The method for producing a molded article according to claim 1, wherein a difference between a mold temperature when molding is performed using the first closed mold and a material temperature when the material is applied to the second closed mold is from 30 to 340° C.

8. The method for producing a molded article according to claim 1, wherein the material is heated and then applied to the first closed mold.

9. The method for producing a molded article according to claim 8, wherein the material is applied to the first closed mold by injection molding.

10. The method for producing a molded article according to claim 1, wherein the material is a UD tape cut to a length of less than 30 mm, and the cut UD tape is applied to the first closed mold.

11. The method for producing a molded article according to claim 1, wherein the thermoplastic resin comprises a polyamide resin.

12. The method for producing a molded article according to claim 1, wherein the thermoplastic resin comprises a polyamide resin constituted from diamine-derived constituent units and dicarboxylic acid-derived constituent units; and 50 mol % or more of the diamine-derived constituent units are derived from xylylenediamine, and 50 mol % or more of the dicarboxylic acid-derived constituent units are derived from an α,ω-linear aliphatic dicarboxylic acid having from 4 to 20 carbons.

13. The method for producing a molded article according to claim 1, wherein the thermoplastic resin comprises a polyolefin resin.

14. The method for producing a molded article according to claim 1, wherein the reinforcing fibers include at least one type selected from the group consisting of glass fibers and carbon fibers.

15. The method for producing a molded article according to claim 1, wherein the number-average fiber length of the reinforcing fibers having a number average fiber length of less than 30 mm and included in the material is from 10 to 25 mm.

16. The method for producing a molded article according to claim 1, wherein the number-average fiber length of the reinforcing fibers having a number-average fiber length of 1 mm or longer and included in the molded article is 1 mm or longer and less than 30 mm.

17. The method for producing a molded article according to claim 1, wherein the number-average fiber length of the reinforcing fibers having a number-average fiber length of 1 mm or longer and included in the molded article is 10 mm or longer and less than 30 mm.

18. The method for producing a molded article according to claim 1, wherein a mold temperature when molding is performed using the second closed mold is from 0.1 to 7° C. lower than the mold temperature when molding is performed using the first closed mold.

19. The method for producing a molded article according to claim 1, wherein the material is heated and then applied to the second closed mold.

* * * * *